US009481207B2

(12) United States Patent
Fanourgiakis et al.

(10) Patent No.: US 9,481,207 B2
(45) Date of Patent: Nov. 1, 2016

(54) ADJUSTABLE SLEEVE FOR ROLLING SUPPORT DEVICE

(71) Applicant: Techni, LLC, Burlingame, CA (US)

(72) Inventors: George Fanourgiakis, Foster City, CA (US); Lawrence J. Brucia, San Anselmo, CA (US)

(73) Assignee: TECHNI, LLC, Burlingame, CA (US)

( * ) Notice: Subject to any disclaimer, the term of this patent is extended or adjusted under 35 U.S.C. 154(b) by 0 days.

(21) Appl. No.: 14/612,157

(22) Filed: Feb. 2, 2015

(65) Prior Publication Data

US 2015/0143662 A1    May 28, 2015

Related U.S. Application Data

(60) Division of application No. 13/846,576, filed on Mar. 18, 2013, now Pat. No. 8,943,648, which is a continuation-in-part of application No. 13/092,064, filed on Apr. 21, 2011, now abandoned, application (Continued)

(51) Int. Cl.
| | | |
|---|---|---|
| *B60B 33/00* | (2006.01) | |
| *B60B 33/04* | (2006.01) | |
| *F16M 11/24* | (2006.01) | |

(Continued)

(52) U.S. Cl.
CPC .......... *B60B 33/04* (2013.01); *B60B 33/0007* (2013.01); *B60B 33/0089* (2013.01); *B60B 33/08* (2013.01); *B62B 5/049* (2013.01); *F16M 11/24* (2013.01); *B60B 33/00* (2013.01); *B60B 2200/20* (2013.01); *B62B 2301/25* (2013.01); *B62B 2301/252* (2013.01);

(Continued)

(58) Field of Classification Search
USPC .......... 248/188.9, 188.91, 346.11, 649, 650, 248/677; 16/24, 33, 42 R; D8/375
See application file for complete search history.

(56) References Cited

U.S. PATENT DOCUMENTS

| | | |
|---|---|---|
| 824,733 A | 7/1906 | Merrick et al. |
| 1,016,324 A | 2/1912 | Patrick et al. |

(Continued)

FOREIGN PATENT DOCUMENTS

WO    2012145633    10/2012

OTHER PUBLICATIONS

U.S. Appl. No. 13/092,064, "Non-Final Office Action", mailed Jun. 21, 2012, 11 pages.

(Continued)

*Primary Examiner* — Alfred J Wujciak
(74) *Attorney, Agent, or Firm* — Kilpatrick Townsend & Stockton LLP

(57) ABSTRACT

A caster device includes a base attachable to a supported item, one or more rolling elements that interface with the base to facilitate rolling of the supported item along a support surface, and an external sleeve coupled to the base for adjustable vertical positioning of the external sleeve relative to the base. The external sleeve can be placed in a first vertical position relative to the base where the rolling element(s) do not contact the support surface, and in a second vertical position relative to the base where the rolling elements do contact the support surface. A rimguard may be rotatively coupled with the external sleeve so that as the external sleeve is rotated to the first vertical position, the bottom rim of the external sleeve rotates relative to a rimguard inner surface and a rimguard outer surface does not rotate relative to the support surface.

20 Claims, 12 Drawing Sheets

Related U.S. Application Data

No. 14/612,157, which is a continuation-in-part of application No. 14/475,243, filed on Sep. 2, 2014, which is a continuation of application No. 13/431,927, filed on Mar. 27, 2012, now Pat. No. 8,820,481.

(60) Provisional application No. 61/468,050, filed on Mar. 27, 2011.

(51) Int. Cl.
  *B62B 5/04* (2006.01)
  *B60B 33/08* (2006.01)

(52) U.S. Cl.
  CPC ............ *Y10T 16/182* (2015.01); *Y10T 16/188* (2015.01); *Y10T 16/1937* (2015.01)

(56) References Cited

U.S. PATENT DOCUMENTS

| | | |
|---|---|---|
| 2,767,420 A | 10/1956 | Riccio |
| 2,770,831 A | 11/1956 | Angelica et al. |
| 3,067,451 A | 12/1962 | Levin et al. |
| 3,455,526 A | 7/1969 | Orii et al. |
| 4,117,999 A | 10/1978 | Gessler |
| 5,001,603 A | 3/1991 | Villaneuva, III et al. |
| 5,001,808 A | 3/1991 | Chung |
| 5,577,703 A | 11/1996 | Young |
| 6,038,734 A | 3/2000 | Facchin |
| 6,135,401 A | 10/2000 | Chen |
| 6,283,437 B1 | 9/2001 | Kang |
| 6,728,991 B2 | 5/2004 | Lai et al. |
| 7,305,737 B2 | 12/2007 | Libakken |
| 7,588,219 B2 | 9/2009 | Levine et al. |
| 7,610,682 B2 | 11/2009 | Polevoy et al. |
| 8,943,648 B2 | 2/2015 | Fanourgiakis et al. |
| 2005/0060840 A1 | 3/2005 | Polevoy et al. |
| 2007/0131826 A1 | 6/2007 | Valkai |
| 2008/0148522 A1 | 6/2008 | Beshore |
| 2010/0039010 A1 | 2/2010 | Hong et al. |
| 2012/0267488 A1 | 10/2012 | Fanourgiakis et al. |
| 2013/0214104 A1 | 8/2013 | Fanourgiakis et al. |

OTHER PUBLICATIONS

U.S. Appl. No. 13/092,064 , "Office Action", mailed Jan. 15, 2013, 10 pages.

U.S. Appl. No. 13/846,576 , "Notice of Allowance", mailed Sep. 29, 2014, 17 pages.

PCT/US2012/034461 , "International Search Report and Written Opinion", mailed Jul. 13, 2012, 13 pages.

ADJUSTABLE SLEEVE FOR ROLLING SUPPORT DEVICE

CROSS-REFERENCES TO RELATED APPLICATIONS

This application is a Division of U.S. patent application Ser. No. 13/846,576, filed Mar. 18, 2013, entitled, "ADJUSTABLE SUPPORT DEVICE WITH MULTIPLE ROLLING ELEMENTS," which is a Continuation In Part of U.S. patent application Ser. No. 13/092,064, entitled "ADJUSTABLE SUPPORT DEVICE WITH MULTIPLE ROLLING ELEMENTS," filed Apr. 21, 2011, the entire disclosures of which are hereby incorporated herein by reference for all purposes. This application is also a Continuation In Part of and claims priority from and the benefit of U.S. patent application Ser. No. 14/475,243, filed Sep. 2, 2014, entitled "CENTER STORE ARRANGEMENT FOR RETAIL MARKETS," which is a Continuation of U.S. application Ser. No. 13/431,927, filed Mar. 27, 2012, which application claims priority from and the benefit of U.S. Provisional Application No. 61/468,050, filed Mar. 27, 2011, the full disclosures of which are incorporated herein by reference for all purposes

BACKGROUND

The present invention relates generally to devices used to support an item relative to a support surface, and more particularly to a height adjustable support device with multiple rolling elements, and related system and methods.

Various devices have been used to reduce the effort required to move an object along a support surface. For example, casters are non-actuated wheels that are mounted to the bottom of a larger object to reduce the effort necessary to move the object. Casters are found in numerous applications, including shopping carts, office chairs, and material handling equipment. High capacity, heavy duty casters are used in many industrial applications, such as platform trucks and carts. Generally, casters operate on smooth and flat surfaces.

Casters do, however, suffer from a number of problems. One disadvantage of casters is shimmy or caster flutter, where a caster rapidly swings side-to-side. Caster flutter may cause the supported object to move in an unwanted direction. Casters may also be easily obstructed by an item such as a power chord or an irregularity of the support surface. And many casters lack provisions for leveling of the supported object and preventing unwanted movement of the supported object along the support surface. Accordingly, improved devices for supporting an object relative to a support surface would be beneficial, particularly devices that do not suffer from the above-identified issues with casters.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Height adjustable support devices for supporting an object relative to a support surface are disclosed, as well as related systems and methods. The disclosed support devices can include multiple rolling elements and can include a height adjustable outer sleeve. The multiple rolling elements increase the load capacity of the support device and increase the tolerance of the support device to irregularities of the support surface. The height adjustable outer sleeve provides for leveling of the supported object and can be positioned to keep obstructions such as power cords from coming into contact with the rolling elements. The height adjustable outer sleeve can also serve to prevent unwanted movement of the supported object along the support surface by lifting the rolling elements out of contact with the support surface and thereby increasing the frictional restraint between the support device and the support surface.

Thus, in one aspect, an adjustable support device is provided. The device includes a base that includes a plurality of rolling element receiving cavities, a plurality of rolling elements that interface with the rolling element receiving cavities, and an external sleeve coupled to the base for adjustable vertical positioning of the external sleeve relative to the base. Each of the rolling element receiving cavities is positioned and oriented to interface with a rolling element disposed between the base and the support surface. The external sleeve can be placed in a first vertical position relative to the base where the external sleeve contacts the support surface. And the external sleeve can be placed in a second vertical position relative to the base where the external sleeve does not contact the support surface.

Suitably shaped rolling elements can be used. For example, the rolling elements can include one or more rolling elements having a spherical shape. And the rolling elements can include one or more rolling elements having a cylindrical shape.

The base can be configured to be rotatable relative to the supported item. For example, the base can include a top portion that remains fixed relative to the supported item when the adjustable support device is attached to a supported item, and a bottom portion that is rotatable relative to the top portion. In many embodiments, the base includes a thrust-bearing coupled between the top portion and the bottom portion. Such an articulated base can be used to orient rolling elements having a cylindrical shape to move along a desired direction of travel.

The base can include a feature for attaching the base to the supported item. For example, the base can include a threaded stud for attaching the base to the supported item. In many embodiments, the threaded stud has a left-handed thread. By using a left-handed thread on the threaded stud, loosening of the attachment between the base and the supported item may be prevented during adjustment of the position of the external sleeve.

The external sleeve can be coupled to the base via a threaded interface. For example, the base can include an externally-threaded portion and the external sleeve can include an internally-threaded portion to interface with the externally-threaded portion of the base so that rotation of the external sleeve relative to the base adjusts the vertical position of the external sleeve relative to the base. The external sleeve can include one or more external wrenching features shaped to interface with a tool used to rotate the external sleeve relative to the base. For example, the one or more external wrenching features can include an opposing pair of parallel flat surfaces. And the one or more external wrenching features can include a plurality of opposing pairs of parallel flat surfaces. Any suitable external wrenching features can be employed.

The base can include two or more of the rolling element receiving receptacles. For example, the base can include three or more, four or more, six or more, or nine or more, rolling element receiving receptacles.

The adjustable support device can include a feature to retain the rolling elements in the rolling element receiving receptacles. For example, the device can include a retention plate attachable to the base and configured to retain the rolling elements in the rolling element receiving receptacles. The retention plate can have a plurality of openings with each of the openings configured to accommodate a portion of one of the rolling elements such that the rolling element partially protrudes below the retention plate. And the device can include one or more removable fasteners to attach the retention plate to the base. The retention plate can include one or more internally-threaded protruding portions that are received within corresponding cavities in the base. Each of the internally-threaded protruding portions can receive one of the removable fasteners.

In many embodiments, the external sleeve can be positioned such that a substantially uniform gap between the external sleeve and the support surface exists and is sufficiently small enough to block objects such as cords from obstructing the rolling elements. For example, in many embodiments, the external sleeve can be positioned to result in a substantially uniform gap of less than 10 mm between the external surface and the support surface. And in many embodiments, the external sleeve can be positioned to result in a substantially uniform gap of less than 5 mm between the external surface and the support surface. And in many embodiments, the external sleeve can be positioned to result in a substantially uniform gap of less than 3 mm between the external surface and the support surface.

In another aspect, a system is provided for supporting an item relative to a support surface. The system includes three or more adjustable support devices. Each of the support devices includes abase that includes a plurality of rolling element receiving cavities, a plurality of rolling elements that interface with the rolling element receiving cavities, and an external sleeve coupled to the base for adjustable vertical positioning of the external sleeve relative to the base. Each of the rolling element receiving cavities is positioned and oriented to interface with a rolling element disposed between the base and the support surface. The external sleeve can be placed in a first vertical position relative to the base where the external sleeve contacts the support surface. And the external sleeve can be placed in a second vertical position relative to the base where the external sleeve does not contact the support surface.

In another aspect, a method is provided for supporting an item relative to a support surface. The method includes receiving a base attached to the supported item so as to be disposed between the supported item and the support surface, the base including a plurality of rolling element receiving receptacles. The method further includes receiving each of a plurality of rolling elements interfaced with one of the rolling element receiving receptacles. The rolling elements are retained relative to the base. The method further includes receiving an external sleeve that is coupled to the base for adjustable vertical positioning of the external sleeve relative to the base. The external sleeve is adjusted relative to the base so that the external sleeve does not contact the support surface and the supported item is supported relative to the support surface via the rolling elements. And the external sleeve is adjusted relative to the base so that the external sleeve contacts the support surface and the supported item is supported relative to the support surface via the contact between the external sleeve and the support surface. The method can further include adjusting the external sleeve relative to the base so that a substantially uniform gap of less than 5 mm is formed between the external sleeve and the support surface.

In various embodiments, an adjustable support device is provided comprising a base, at least one rolling element, an external sleeve, and a rimguard. The base can be attachable to a supported item so as to be disposed between the supported item and a support surface, and the base can include at least one rolling element receiving receptacle, each rolling element receiving receptacle positioned and oriented to interface with a rolling element disposed between the base and the support surface. Each rolling element in the adjustable support device interfaces with one of the rolling element receiving receptacles. The external sleeve can be coupled with the base and rotatable to adjust a vertical positioning of one of the base and the external sleeve relative to the other of the sleeve and the base. The external sleeve can be rotated to a first vertical position where no rolling element contacts the support surface, and the external sleeve can be rotated to a second vertical position where at least one rolling element contacts the support surface. The rimguard can be coupled to the external sleeve. The rimguard can comprise a rimguard inner surface disposed adjacent a bottom rim of the external sleeve, and the rimguard can comprise a rimguard outer surface facing the support surface. As the external sleeve is rotated to the first vertical position, the rimguard outer surface can interact with the support surface such that the rimguard outer surface remains in place relative to the support surface while the bottom rim of the external sleeve rotates relative to the rimguard inner surface.

In some embodiments, the rimguard comprises sidewalls defining a hollow body. The rimguard can comprise a shelf extending into the hollow body from a lower portion of the sidewalk and providing the inner surface adjacent the bottom rim of the external sleeve upon which the external sleeve can rotate. The external sleeve can comprises a groove, and the rimguard can comprise an edge extending into the hollow body from an upper portion of the sidewalls. The edge can be received in the groove for coupling the rimguard to the external sleeve and supporting the rimguard relative to the external sleeve when the external sleeve is in the second vertical position. The edge can be jagged and comprise a plurality of tips, wherein only the tips are received in the groove. The edge can comprise an inner perimeter characterized by semicircular notches which define tips between adjacent notches, wherein only the tips are received in the groove. The rimguard can comprises ultra high molecular weight plastic. The rimguard can be removable from the external sleeve.

For a fuller understanding of the nature and advantages of the present invention, reference should be made to the ensuing detailed description and accompanying drawings.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention can be practiced without the specific details. Furthermore, well-known features may be omitted or simplified in order not to obscure the embodiment being described.

Figure 1:
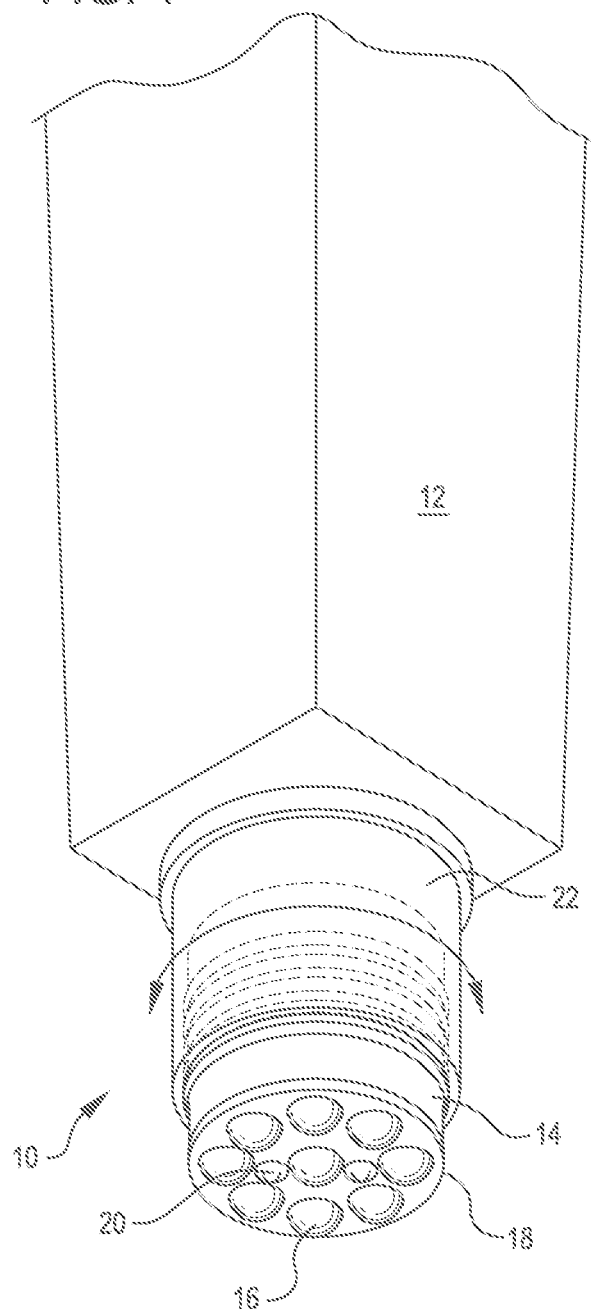
FIG. 1 is a perspective view illustrating an adjustable support device, in accordance with many embodiments, attached to the leg of a supported item.

Referring now to the drawings, in which like reference numerals represent like parts throughout the several views, FIG. 1 shows an adjustable support device 10 attached to supported item 12. The support device 10 includes a base 14, a plurality of rolling elements 16 that are retained within rolling element receiving cavities of the base by a retention plate 18. The base 14 has a generally cylindrical shape. Each of the rolling element receiving cavities is shaped and sized to permit the rolling element to rotate in the rolling element receiving cavity. The retention plate 18 is secured to the base 14 by removable fasteners 20. The retention plate includes apertures that are shaped, sized, and positioned to retain each of the rolling elements 16 while allowing a portion (e.g., a ⅓ diametrical portion) of each of the rolling elements to protrude below the bottom surface of the retention plate 18. An adjustable external sleeve 22 has a generally cylindrical body and is coupled with the base 14 so that the vertical position of the external sleeve 22 relative to the base 14 can be adjusted. While the external sleeve 22 of the present embodiment has a cylindrical external shape, other suitable configurations can be used, for example, polygonal external shapes can be used. In many embodiments, the base 14 includes an externally-threaded portion that interfaces with an internally-threaded portion of the external sleeve 22 so that rotation of the external sleeve relative to the base results in vertical movement of the external sleeve relative to the base. In many embodiments, the external sleeve can be positioned out of contact with a support surface so that the rolling elements contact the support surface and can be positioned to contact the support surface and adjusted to aid in leveling the supported item. When the external sleeve is adjusted to contact the support surface it may also help prevent inadvertent movement of the supported item along the support surface by increasing the amount of sliding friction present.

Figure 2:
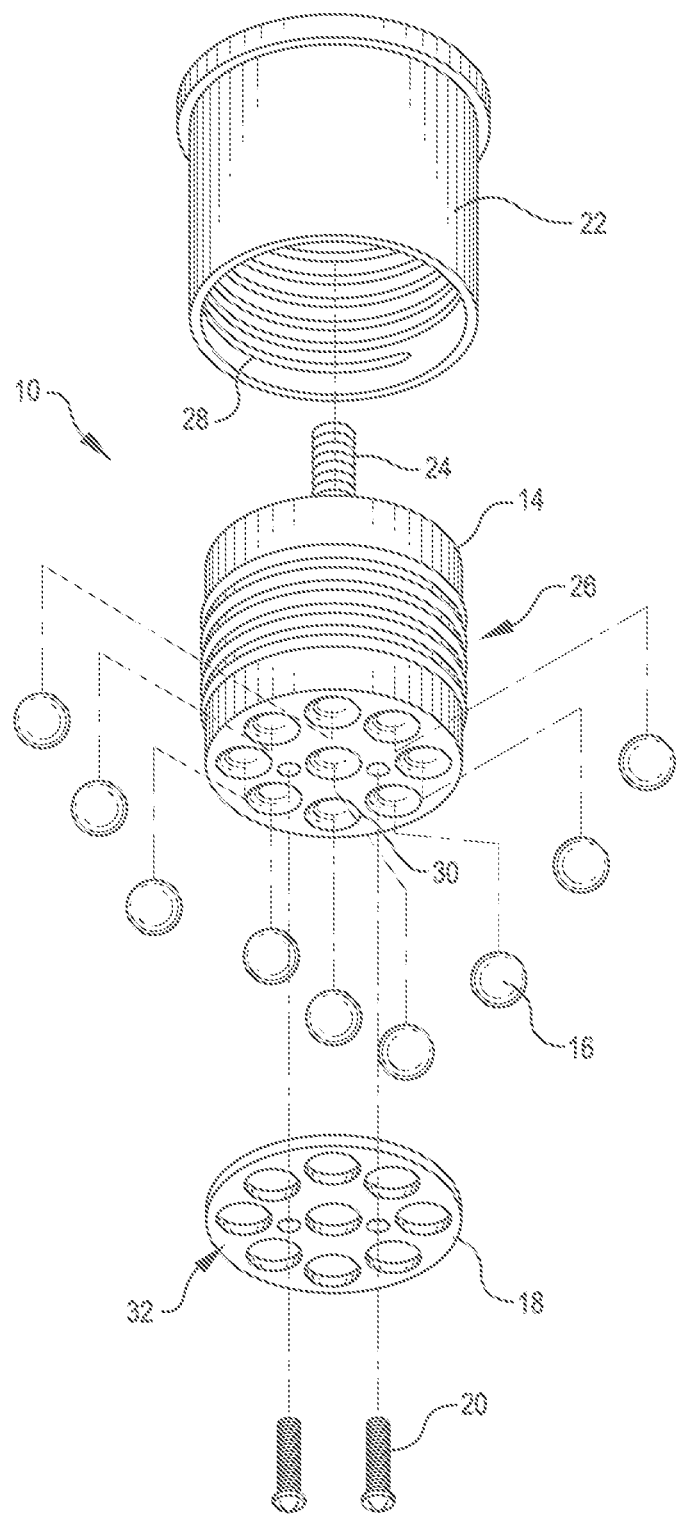
FIG. 2 is an exploded perspective view illustrating the adjustable support device of FIG. 1.

FIG. 2 is an exploded perspective view of the adjustable support device 10. The base includes a threaded stud 24 for attaching the base 14 to a supported item (e.g., to a leg of a supported item). In many embodiments, the threaded stud 24 has a left-handed thread so that when the external sleeve 22 is adjusted downward relative to the base the threaded stud does not unscrew from the supported item. The threaded stud 24 can have any suitable configuration to interface with the supported item. For example, when the base is attached to a wooden leg of the supported item, the threaded stud can include a self tapping thread (e.g., wood screw thread, lag bolt thread). And the supported item can include an internally-threaded receptacle or nut that receives the threaded stud.

The base 14 includes an externally-threaded portion 26 that interfaces with an internally-threaded portion 28 of the external sleeve 22. Any suitable configuration of thread can be used. For example, a fine thread with a pitch of 1.25 mm can be used.

The base 14 has nine rolling element receiving receptacles 30 that are shaped and sized to accommodate a corresponding nine rolling elements 16. For example, each of the rolling element receiving cavities 30 can be spherically shaped (e.g., a half sphere) and sized to accommodate a spherically-shaped rolling element 16 so as to permit the rolling element to rotate relative to the rolling element receiving cavity. Any suitable diameter of spherically-shaped rolling element can be used (e.g., ³⁄₁₆ inch). While the adjustable support device 10 is shown with nine rolling element receiving receptacles, any suitable number of rolling element receiving receptacles and associated rolling elements can be used. For example, two, three, four or more, six or more, and more than nine rolling element receiving receptacles and associated rolling elements can also be used.

Additionally, a suitable number of smaller rolling elements, such as BBs, can also be disposed within rolling element receiving receptacles 30 to provide an improved rolling surface for rolling elements 16.

The retention plate 18 is attached to the base 14 by the two removable fasteners 20 that engage internally-threaded holes in the base, thereby retaining the rolling elements in the rolling element receiving receptacles. Other suitable ways of attaching the retention plate to the base case can also be used And other suitable ways of retaining the rolling elements can also be used.

The rolling element receiving cavities and the retention plate are shaped and sized to accommodate and retain the rolling elements. With the retention plate removed, the rolling element receiving cavities are shaped and sized to receive the rolling elements. The retention plate has a circular flat body with apertures 32 having side walls shaped to accommodate and retain the rolling elements. As shown in both FIG. 3 and FIG. 4, the side walls of the apertures 32 are tapered or contoured to retain the rolling elements within the rolling element receiving cavities.

Figure 3:
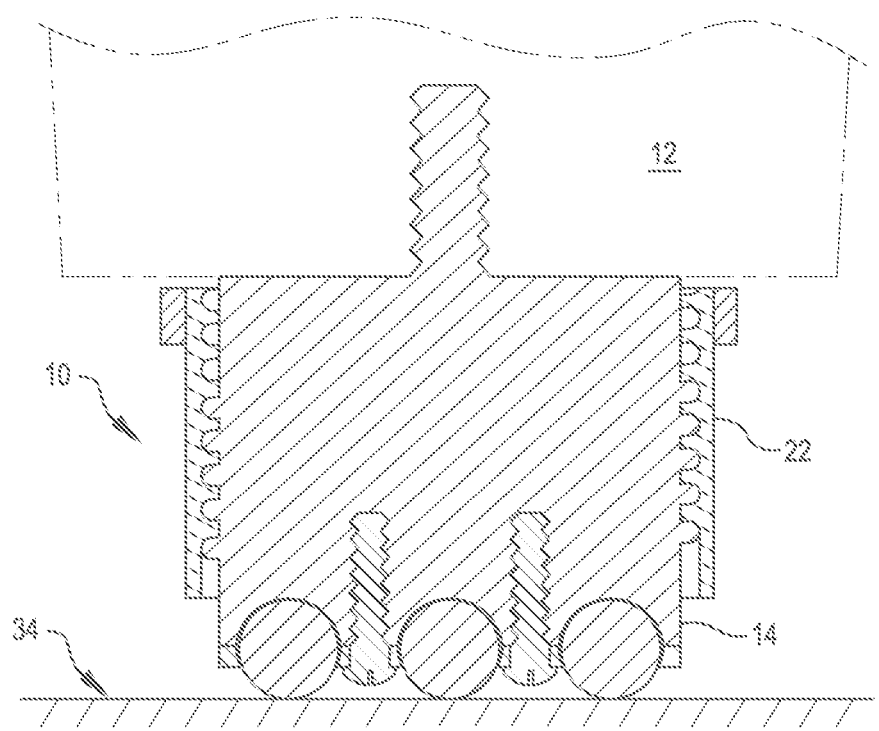
FIG. 3 is a cross-sectional view of the adjustable support device of FIG. 1 with an external sleeve positioned so that the supported item is supported via rolling elements of the support device.
Figure 4:
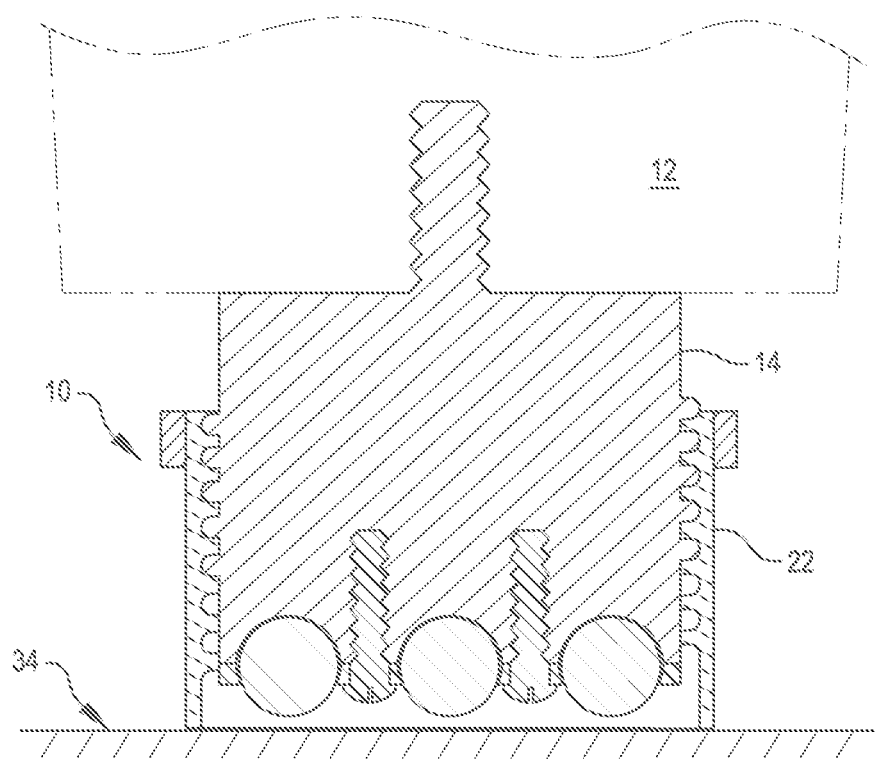
FIG. 4 is a cross-sectional view of the adjustable support device of FIG. 1 with the external sleeve positioned to contact a support surface so as to support the supported item.

FIG. 3 and FIG. 4 also illustrate possible positions of the adjustable sleeve 22 relative to the base 14. FIG. 3 shows the adjustable sleeve 22 positioned above a support surface 34 so that the rolling elements contact the support surface, and thereby provides rolling elements between the support surface and the supported item 12 to reduce the effort necessary to move the supported item along the support surface. And FIG. 4 shows the adjustable sleeve 22 positioned to contact the support surface 34 so that the rolling elements are elevated above the support surface, thereby providing a way to level the supported item 12 and to restrict movement of the supported item along the supported surface by providing a non-rolling contact between the support device 10 and the support surface 34.

Figure 5:
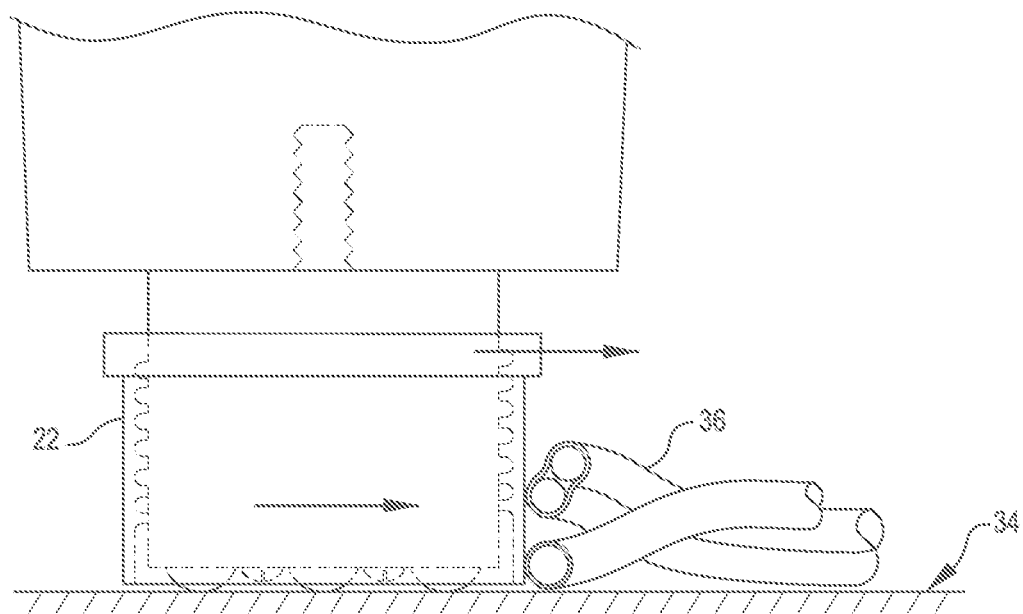
FIG. 5 is a side view of the adjustable support device of FIG. 1 with the external sleeve positioned so that a small gap exists between the external sleeve and the support surface so that the external sleeve functions as a guard to prevent items such as cords from obstructing the rolling elements, in accordance with many embodiments.

FIG. 5 shows the adjustable sleeve 22 positioned so that a relatively small gap exists between the adjustable sleeve and the support surface 34. As illustrated, this configuration may be useful in preventing possible obstructions such as electrical cords 36 from contacting the rolling elements and thereby helping to prevent obstruction of the rolling elements.

Figure 6:
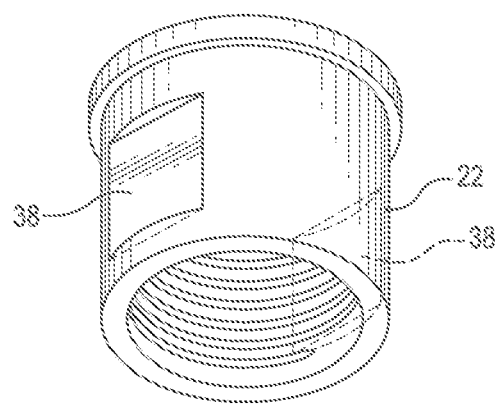
FIG. 6 is a perspective view illustrating an adjustable external sleeve of an adjustable support device, in accordance with many embodiments.

FIG. 6 shows a perspective view of an adjustable external sleeve 22 that includes external wrenching features shaped to interface with a tool used to rotate the external sleeve 22 relative to the base. The external wrenching features are a pair of opposed parallel surfaces 38 that can be engaged by a tools such an open-ended wrench to rotate the external sleeve relative to the base, thereby adjusting the vertical position of the external sleeve relative to the base. While a single pair of opposed parallel surfaces are shown, any other suitable wrenching features can be used. For example, any suitable number of opposing pairs of parallel flat surfaces can be used.

Figure 7:
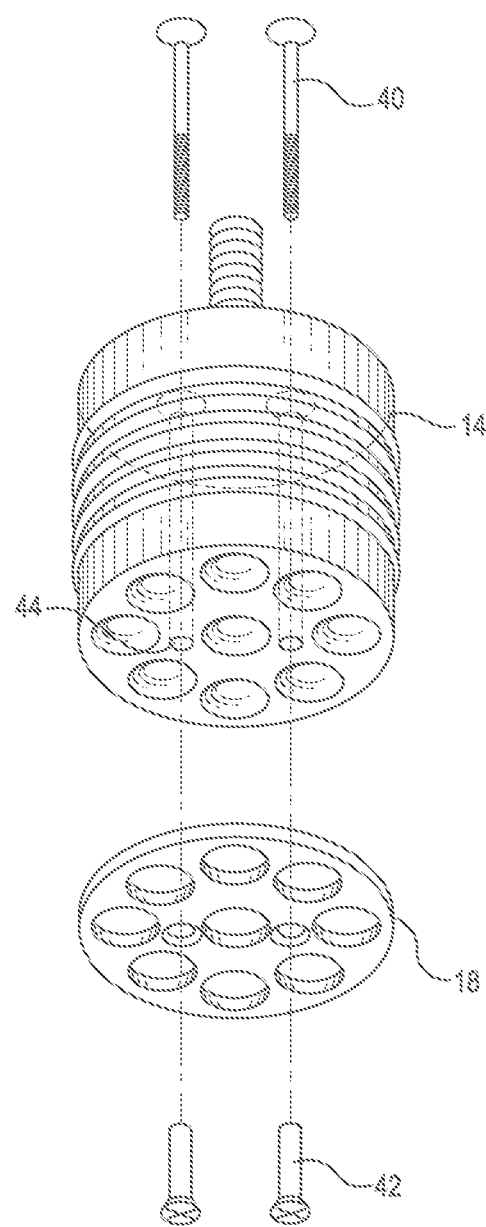
FIG. 7 is a perspective view illustrating the attachment of a retention plate to a base of an adjustable support device, in accordance with many embodiments.
Figure 8:
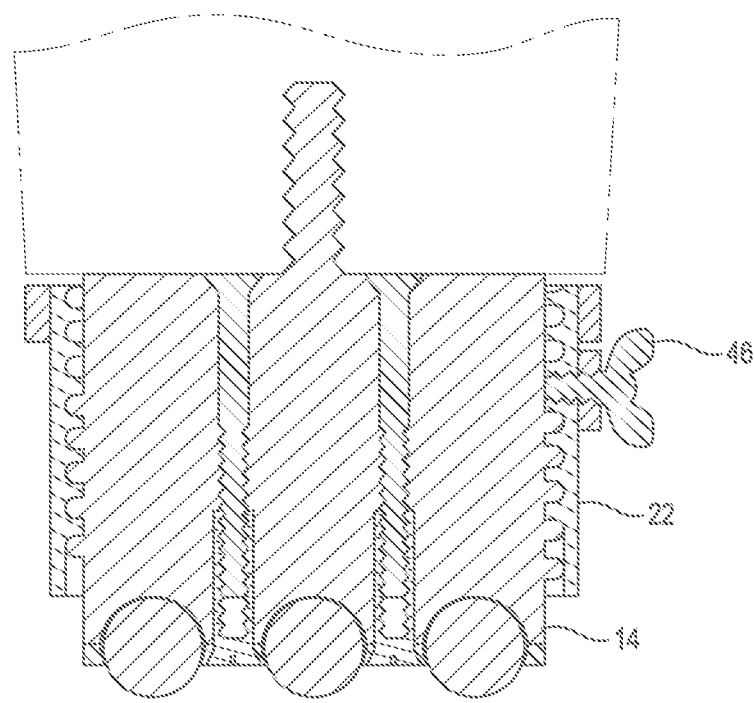
FIG. 8 is a cross-sectional view illustrating the adjustable support device of FIG. 7 and further illustrating a set screw used to secure the position of an adjustable external sleeve relative to a base, in accordance with many embodiments.

FIG. 7 and FIG. 8 show another way of attaching the retention plate 18 to the base 14. Two externally-threaded recessed head bolts 40 engage mating recessed head internally-threaded mating elements 42, thereby providing a flush installation where the attachment fasteners do not protrude below the retention plate 18. The base 14 includes recesses 44 sized and shaped to accommodate the bolts 40 and the mating elements 42.

FIG. 8 further illustrates a retention screw 46 operable to prevent inadvertent rotation of the adjustable sleeve 22 relative to the base 14, thereby preventing inadvertent vertical movement of the adjustable sleeve relative to the base.

Figure 9:
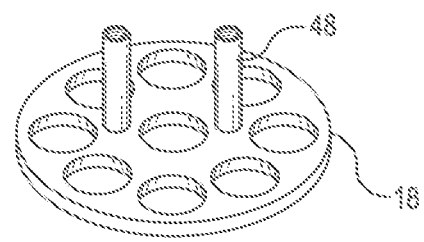
FIG. 9 is a perspective view illustrating a retention plate having integral protruding internally-threaded portions used to secure the retention plate to a base, in accordance with many embodiments.

FIG. 9 shows a retention plate 18 with integral protruding portions 48 that are internally-threaded to receive and couple with the bolts 40.

The various components of the adjustable support device 10 can be fabricated from suitable materials. For example, the base 14 and the adjustable sleeve 22 can be made from a suitable material, such any suitable alloy of aluminum or stainless steel with any suitable heat treatment. Alternatively, the base and the adjustable sleeve can be made from any suitable titanium, copper, galvanized metal, plastic, and nylon. The support balls 16 can be made from, for example, nylon, stainless steel, steel, polyurethane, plastic, carbon fiber, ceramic, Teflon, and copper.

Figure 10:
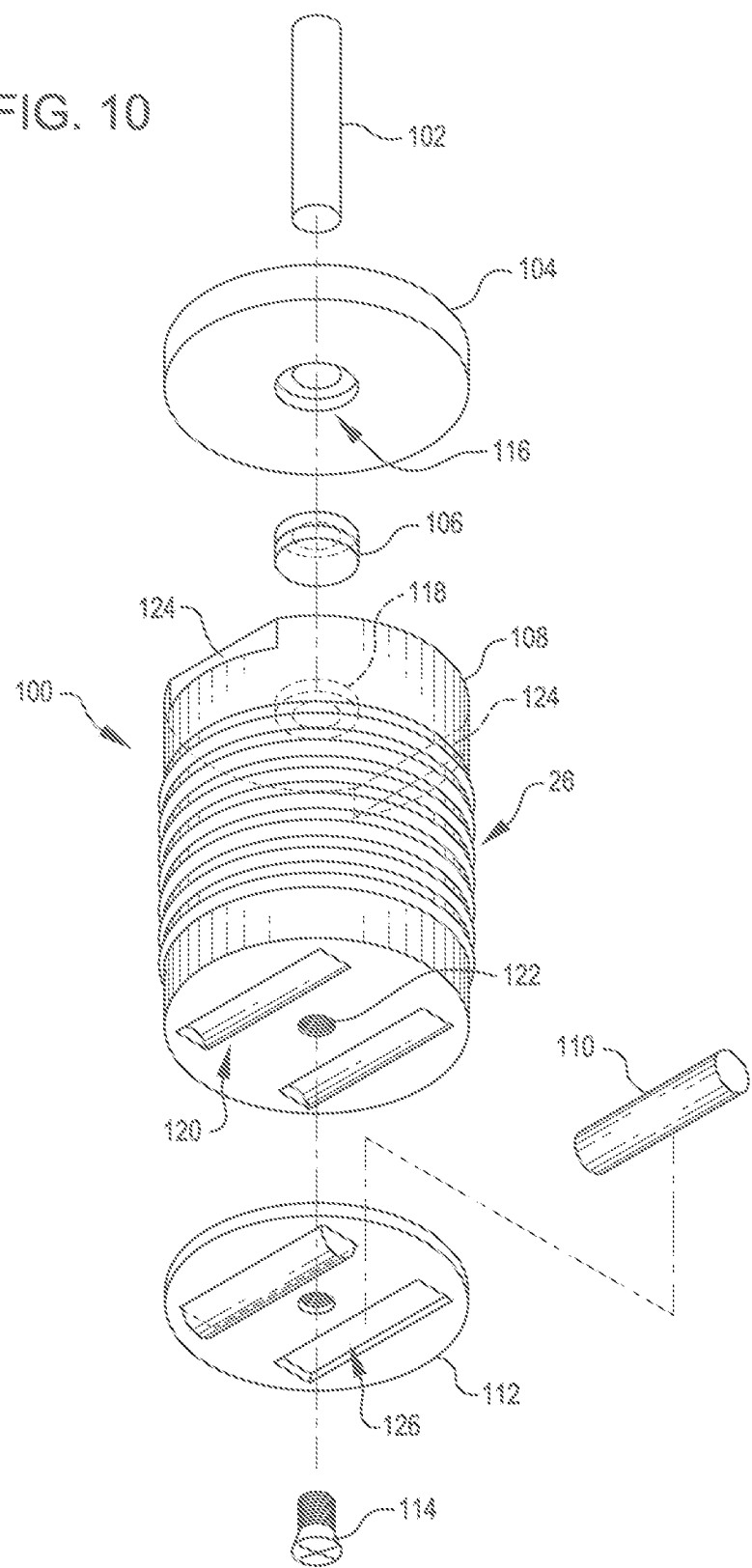
FIG. 10 is an exploded-perspective view illustrating an adjustable support device, in accordance with many embodiments, having cylindrical rolling elements, the adjustable support device being rotatable relative to a supported item to orient the cylindrical rolling elements for movement along a desired direction of travel.

FIG. 10 is an exploded perspective view of an adjustable support device 100 that has cylindrically-shaped rolling elements and that is rotatable relative to the supported item so that the cylindrically-shaped rolling elements can be oriented to move along a desire direction. The adjustable support device 100 includes a mounting pin 102, a base top portion 104, a thrust bearing 106, a base bottom portion 108, cylindrically-shaped rolling elements 110, a retention plate 112, and a retention plate fastener 114.

The mounting pin 102 has a cylindrical outer surface that interfaces with the inside diameter of the thrust bearing 106. The mounting pin 102 can be appropriately coupled with the supported item and/or the base bottom portion 108. For example, the mounting pin 102 can include an upper threaded portion for attaching the mounting pin 102 with the supported item such that the mounting pin 102 extends vertically downward from the supported item. As another example, the mounting pin can include a lower threaded portion for attaching the mounting pin 102 with the base bottom portion 108 such that the mounting pin 102 extends vertically upward from the base bottom portion 108.

The base top portion 104 interfaces with the supported item. The base top portion 104 includes an aperture through which the mounting pin 102 extends and a receptacle 116 shaped to receive and support the top portion of the thrust bearing 106. The base top portion 104 can serve as a non-rotating part of the adjustable support device 100 relative to the supported item.

The thrust bearing 106 interfaces with the receptacle 116 in the base top portion and a similar receptacle 118 in the base bottom portion 108. The portion of the weight of the supported item that is supported by the adjustable support device 100 is transferred from the base top portion 104 to the base bottom portion 108 through the thrust bearing 106. The thrust bearing 106 also provides for relative rotation between the base top portion 104 and the base bottom portion 108.

The base bottom portion 108 can include features similar to features of the base portion 14 of the adjustable support device 10. The base bottom portion 108 includes an externally-threaded portion 26, rolling element receiving cavities 120, and the receptacle 118 shaped to receive and support the bottom portion of the thrust bearing 106. The base bottom portion 108 includes a threaded hole 122 used to secure the retention plate 112 to the base bottom portion 108 via the retention plate fastener 114. While only one threaded hole 122 and a corresponding one retention plate fastener 114 is shown, any suitable approach fix attaching the retention plate 112 to the base bottom portion 108 can be used. For example, the attachment approaches used to attach the retention plate 18 to the base 14 in the adjustable support device 10 can also be used in the adjustable support device 100. Each of the rolling element receiving cavities 120 is shaped to accommodate one of the cylindrically-shaped rolling elements 110 and to allow the cylindrically-shaped rolling elements 110 to rotate within the rolling element receiving cavities 120 during movement of the supported item along the support surface. While the adjustable support device 100 is shown with two cylindrically-shaped rolling elements 110, any suitable number and combination of rolling element types can be used. For example, one or more rolling elements having a spherical shape can be used in conjunction with one or more cylindrically-shaped rolling elements 110. Each of the rolling element receiving cavities 120 can have a half-cylindrical configuration. The base bottom portion 108 includes opposing parallel surfaces 124, which can be used as external wrenching features that can interface with a tool used to rotate the base bottom portion 108 relative to the supported item to orient the cylindrically-shaped rolling elements 110 for movement of the supported item in a desired direction along the support surface. In general, any other suitable external wrenching feature(s) can be used.

The retention plate 112 includes apertures 126 that are shaped, sized, and positioned to retain each of the cylindrically-shaped rolling elements 110 within the rolling element receiving cavities 120 while allowing a portion (e.g., ⅓ diametrical portion) of each of the cylindrically-shaped rolling elements 110 to protrude below the bottom surface of the retention plate 112. Each of the apertures 126 can have sloped side walls shaped to accommodate the cylindrical outer surface of the cylindrically-shaped rolling element 110.

Figure 11:
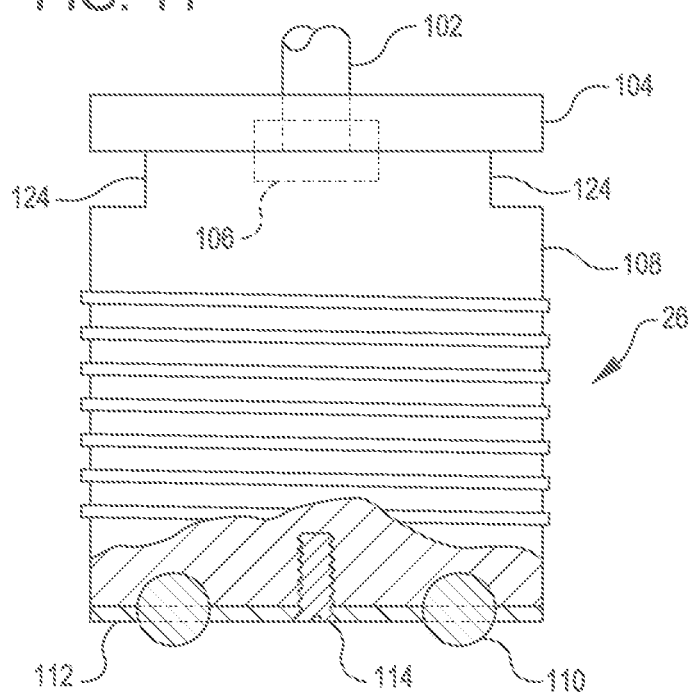
FIG. 11 is a side view illustrating the adjustable support device of FIG. 10.
Figure 12:
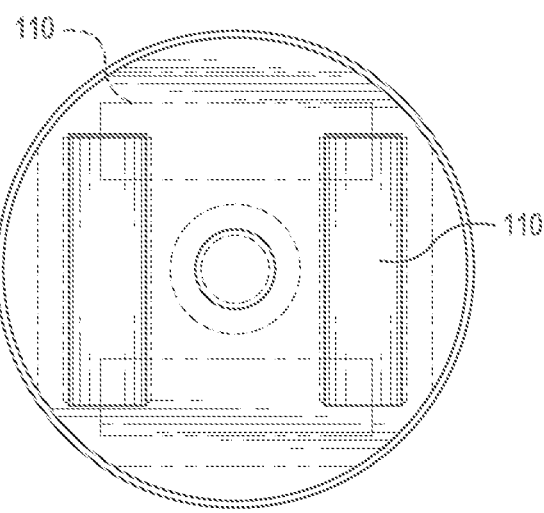
FIG. 12 is a bottom view illustrating the adjustable support device of FIG. 10.

FIG. 11 and FIG. 12 further illustrate the adjustable support device 100. FIG. 11 is a side view of the adjustable support device 100. And FIG. 12 is a bottom view of the adjustable support device 100 and shows in phantom an alternate orientation of the cylindrically-shaped rolling elements 110 that can be obtained by rotating the base bottom portion 108 relative to the supported item.

The various components of the adjustable support device 100 can be fabricated from any suitable material, for example, from the materials discussed above with respect to corresponding components of the adjustable support device 10. Similarly, the various components of the adjustable support device 100 can be suitably sized and configured, for example, sized and configured similar to the adjustable support device 10.

Figure 13:
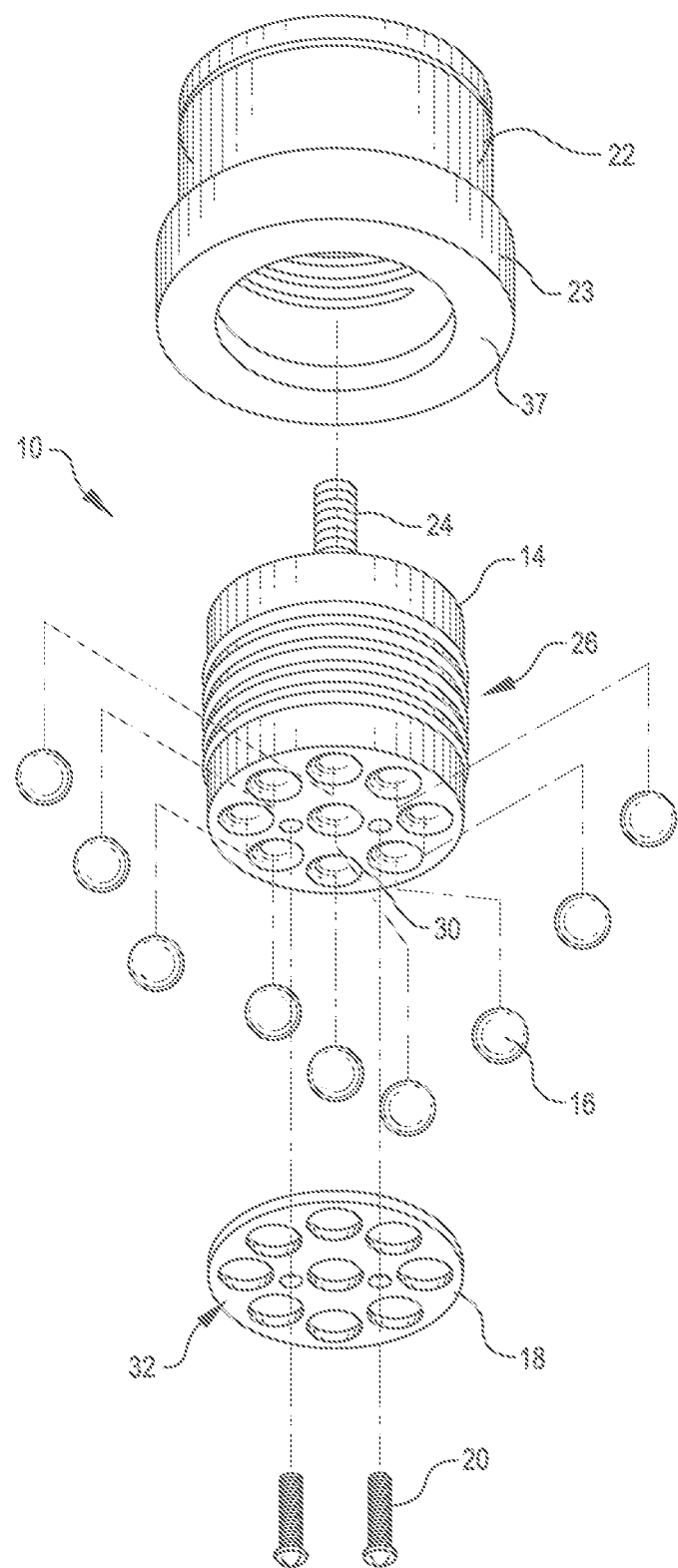
FIG. 13 is an exploded perspective view of an adjustable support device having a rimguard, in accordance with many embodiments.
Figure 15:
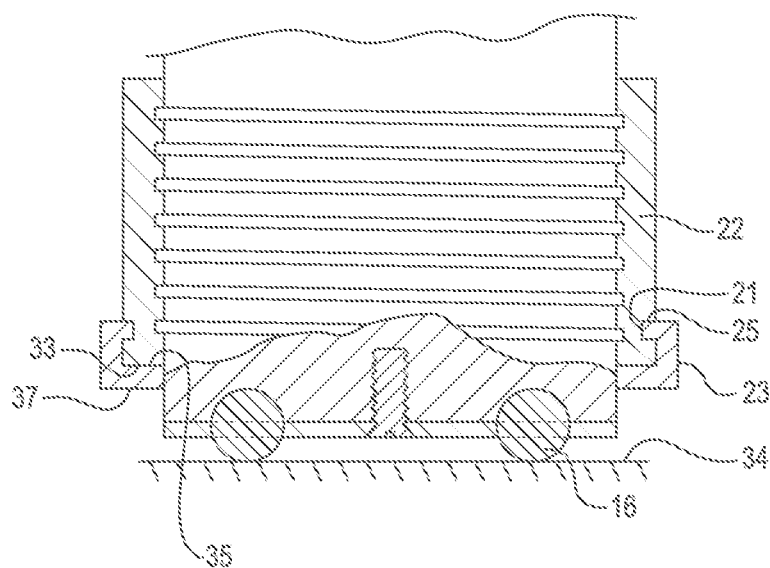
FIG. 15 is a side cut-away view of the adjustable support device of FIG. 13 with an external sleeve positioned so that the supported item is supported via rolling elements of the support device.
Figure 16:
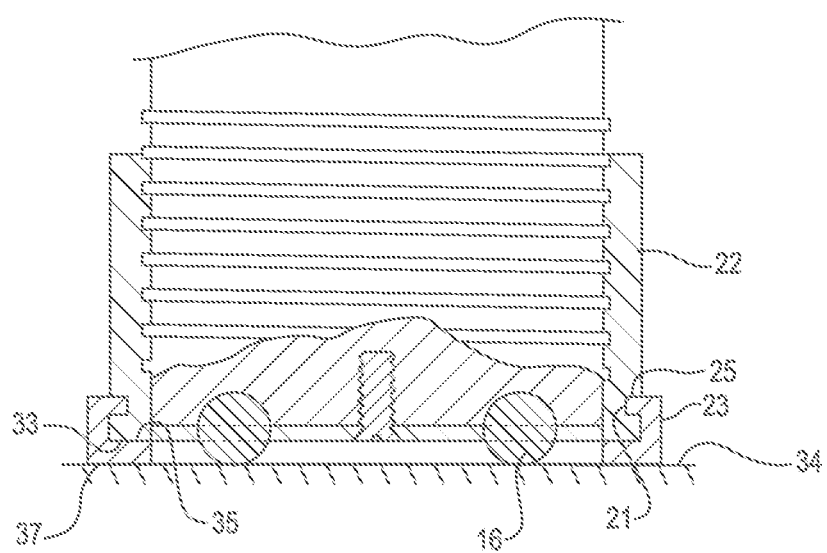
FIG. 16 is a side cut-away view of the adjustable support device of FIG. 13 with an external sleeve positioned so that the supported item is supported via rolling elements of the support device and so that the rimguard contacts the support surface.
Figure 17:
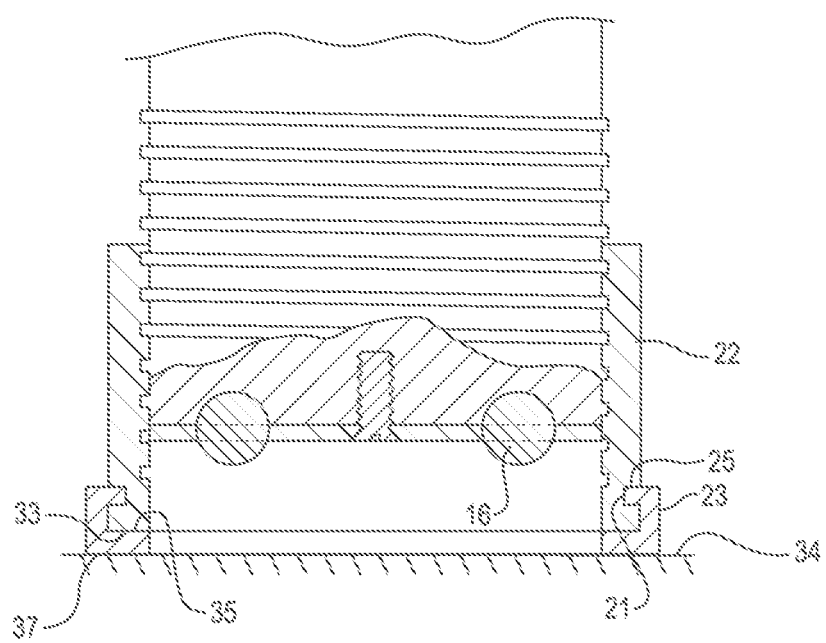
FIG. 17 is a side cut-away view of the adjustable support device of FIG. 13 with an external sleeve positioned so that the rimguard contacts the support surface and the supported item is not supported via rolling elements of the support device.

FIG. 13 shows an exploded perspective view of an adjustable support device having a rimguard 23. In many embodiments, the external sleeve 22 includes a rimguard 23 coupled to the sleeve 22 and disposed between its bottom rim 35 and the support surface 34. The rimguard 23 can provide a low friction surface in lieu of the support surface 34 for the sleeve 22 to move against when it is rotated to adjust vertical positioning of either the base 14 or the sleeve 22. As best shown in FIGS. 15-17, in various embodiments, as the external sleeve 22 is rotated from a position where the rolling elements 16 in the base 14 contact the support surface 34 to a position where the rolling elements 16 in the base 14 are raised out of contact with the support surface 34, the bottom or outer surface 37 of the rimguard engages the support surface 34 so that the rimguard 23 stays in place relative to the support surface 34. With the rimguard 23 so secured, the external sleeve 22 may turn against an inner surface 33 of the rimguard 23, which may provide a lower friction surface than the support surface 34 and may prevent damage to the support surface 34.

Figure 14:
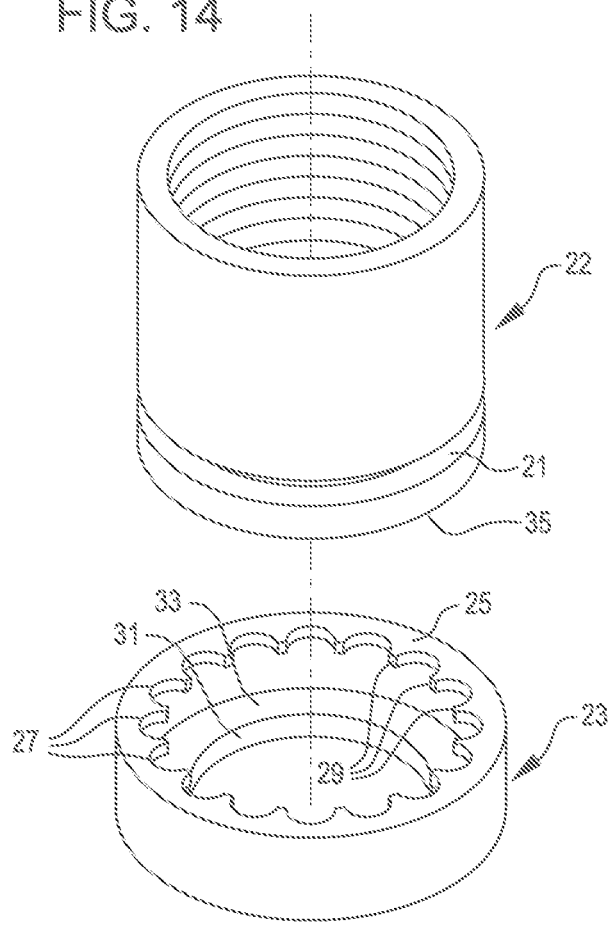
FIG. 14 is an exploded perspective view of an external sleeve and rimguard assembly, in accordance with many embodiments.

FIG. 14 is an exploded perspective view showing an external sleeve 22 and rimguard 23 assembly, in accordance with many embodiments. In many embodiments, the rimguard 23 is shaped like a hollow cylinder with holes in each end and sidewalk connecting the two ends. The lower end of the rimguard can have a central opening and a shelf 31 extending inward from the sidewalls to the perimeter of the opening. The rimguard upper end can have an edge 25 extending into the hollow body from an upper portion of the sidewalls, and the edge 25 can be received into a groove 21 in the external sleeve 22 in order to couple the pieces together. Thus, in many embodiments, when the external sleeve 22 is positioned such that the rolling elements 16 contact the support surface 34, the rimguard 23 is supported by the external sleeve 22 above the support surface 34, specifically by the interaction of the edge 25 sitting in the groove 21. In many embodiments, when the external sleeve 22 is positioned such that the rolling elements 16 are out of contact with the support surface 34, the bottom surface 37 of the rimguard 23 contacts the support surface 34, and the inner top surface 33 of the shelf 31 provides a surface on which the bottom rim 35 of the external sleeve 22 may rotate for further vertical positioning adjustment of the sleeve 22 or base 14 relative to the support surface 34.

FIG. 15, FIG. 16, and FIG. 17 also illustrate some possible positions of the adjustable sleeve 22 and the base 14 relative to the support surface 34. FIG. 15 shows the rimguard 23 positioned above a support surface 34 so that rolling elements 16 contact the support surface 34, thereby providing rolling elements 16 between the support surface 34 and the supported item 12 to reduce the effort necessary to move the supported item 12 along the support surface 34. FIG. 17 shows the adjustable sleeve 22 positioned so that the rolling elements 16 are elevated above the support surface 34, thereby providing a way to level the supported item 12 and to restrict movement of the supported item 12 along the supported surface 34 by providing a non-rolling contact between the support device 10 and the support surface 34. FIG. 16 shows an intermediate position of the adjustable sleeve 22, wherein the sleeve 22 is in communication with the support surface 34 via the rimguard 23 and the rolling elements 16 are still contacting the support surface 34. At this point, the result of continued rotation of the external sleeve 22 will switch between adjusting the vertical positioning of the sleeve 22 and adjusting the vertical positioning of the base 14. In other words, if rotation of the sleeve 22 has been lowering the vertical positioning of the sleeve 22 (for example moving the sleeve 22 from the position shown in FIG. 15 to the position shown in FIG. 16), then once the sleeve 22 reaches the position shown in FIG. 16, the continued rotation of the sleeve 22 in the same direction will cause the sleeve 22 to turn in place without changing its vertical position relative the support surface 34, and the continued rotation in the same direction will instead raise the vertical positioning of the base 14 and rolling elements 16 relative to the support surface 34 (for example moving the base 14 from the position shown in FIG. 16 toward the position shown in FIG. 17). If rotation of the sleeve 22 has been lowering the vertical positioning of the base 14 relative the support surface (for example moving the base 14 from the position shown in FIG. 17 to the position shown in FIG. 16), then once the base 14 reaches the position shown in FIG. 16, the continued rotation of the sleeve 22 in the same direction will no longer adjust the vertical positioning of the base 14 relative the support surface 34, but will instead raise the vertical positioning of the sleeve 22 relative the support surface 34 (for example moving the sleeve from the position shown in FIG. 16 toward the position shown in FIG. 15).

Embodiments include other variations of the rimguard 23 as well. For example, the edge 25 can be contoured in a variety of ways, including shaped, smooth, or jagged. In various embodiments, edge 25 comprises an inner perimeter characterized by notches 27. Notches 27 can have a variety of shapes, such as arced or semicircular, and can be uniform or non-uniform with other notches 27 in edge 25. As shown in FIG. 14, notches 27 may also define tips 29 between adjacent notches. In various embodiments, only the tips 29 are received in the groove 21. Notches 27 can provide several advantages, including decreasing the amount of material necessary to fabricate rimguard 23 and facilitating installation of rimguard 23 onto sleeve 22. For example, in various embodiments, the rimguard 23 and external sleeve 22 are fabricated as separate pieces, and the rimguard 23 must be installed on the external sleeve 22. In embodiments, the rimguard 23 can be first positioned in a tilted orientation so that a part of the edge 25 engages a part of the groove 21, while an opposite side of the edge 25 interferes with the bottom rim 35. A sufficient force can then be applied on the interfering side of the edge 25 to cause it to flex outwardly to fit around the bottom rim 35, and the position of the rimguard can then be adjusted until the flexed side of the edge 25 is aligned with the groove 21, allowing the flexed side of the edge 25 to unflex and snap into engagement with the groove 21 to complete installation. In this arrangement, the notches 27 reduce the amount of material available to provide resistance to flexing during installation, making the edge 25 more flexible and the rimguard 23 accordingly easier to install onto the sleeve 22. In some embodiments, the rimguard 23 comprises material selected having sufficient flexibility to facilitate installation of the rimguard 23 on the sleeve 22. In various embodiments, the rimguard 23 comprises ultra high molecular weight plastic. In embodiments, to make the rimguard 23 more flexible for installation onto the sleeve 22, the rimguard 23 is heated, for example, with a blow torch.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described demerits in all possible variations thereof is encompassed by the invention unless otherwise indicated herein or otherwise clearly contradicted by context.

What is claimed is:

1. A caster device comprising:
   a base attachable to a supported item so as to be disposed between the supported item and a support surface;
   at least one rolling element, each rolling element interfacing with the base so as to be disposed at least partially between the base and the support surface and so as to facilitate rolling of the supported item along the support surface;
   an external sleeve coupled with the base and rotatable to adjust a vertical positioning of one of the base and the external sleeve relative to the other of the external sleeve and the base, wherein the external sleeve can be rotated to a first vertical position where said at least one rolling element does not contact the support surface, and wherein the external sleeve can be rotated to a second vertical position where said at least one rolling element contacts the support surface; and
   a rimguard rotatively coupled with the external sleeve and comprising a rimguard inner surface disposed facing a bottom rim of the external sleeve and a rimguard outer surface facing the support surface, wherein as the external sleeve is rotated to the first vertical position, the rimguard outer surface interacts with the support surface such that the rimguard outer surface does not rotate relative to the support surface while the bottom rim of the external sleeve rotates relative to the rimguard inner surface.

2. The caster device of claim 1, wherein the rimguard outer surface and the rimguard inner surface are configured so that the rimguard outer surface provides higher friction between the rimguard outer surface and the support surface than the friction between the rimguard inner surface and the bottom rim of the external sleeve, such that the rimguard outer surface does not rotate relative to the support surface while the bottom rim of the external sleeve rotates relative to the rimguard inner surface.

3. The caster device of claim 1, wherein the rimguard comprises:
   sidewalls defining a hollow body;
   a shelf extending into the hollow body from a lower portion of the sidewalls and providing the inner surface adjacent the bottom rim of the external sleeve.

4. The caster device of claim 3, wherein the external sleeve further comprises a groove and the rimguard further comprises an edge extending into the hollow body from an upper portion of the sidewalls, wherein the edge is received in the groove for coupling the rimguard with the external sleeve and, when the external sleeve is in the second vertical position, supporting the rimguard relative to the external sleeve.

5. The caster device of claim 4, wherein the edge is jagged and comprises a plurality of tips, wherein only the tips are received in the groove.

6. The caster device of claim 1, wherein the rimguard comprises ultra high molecular weight plastic.

7. The caster device of claim 1, wherein the rimguard is removable.

8. The caster device of claim 1, wherein said at least one rolling element comprises a rolling element having a spherical shape.

9. The caster device of claim 1, wherein said at least one rolling element comprises a rolling element having a cylindrical shape.

10. The caster device of claim 9, wherein the base comprises a top portion and a bottom portion that is rotatable relative to the top portion.

11. The caster device of claim 10, wherein the base comprises a thrust bearing coupled between the top and bottom portions.

12. The caster device of claim 1, wherein the at least one rolling element includes three or more rolling elements.

13. The caster device of claim 12, wherein the at least one rolling element includes six or more rolling elements.

14. The caster device of claim 1, further comprising a retention plate attachable to the base and configured to retain said at least one rolling element relative to said base, the retention plate having one or more openings, each opening configured to accommodate a portion of one of said at least one rolling element such that said one rolling element partially protrudes below the retention plate.

15. The caster device of claim 14, further comprising one or more removable fasteners to attach the retention plate to the base.

16. The caster device of claim 15, wherein the retention plate includes one or more internally-threaded protruding portions that are received within corresponding one or more cavities in the base, each of the internally-threaded protruding portions receiving one of the one or more removable fasteners.

17. The caster device of claim 1, wherein the base comprises:
a threaded stud fixed to the base and having a thread for attaching the base to the supported item by rotating the threaded stud in a first direction; and
an externally-threaded portion;
wherein the external sleeve includes an internally-threaded portion configured to interface with the externally-threaded portion of the base, and wherein the external sleeve can be rotated to the first position from the second position by rotating the external sleeve in the first direction.

18. The caster device of claim 17, wherein the thread of the threaded stud is a left-handed thread.

19. The caster device of claim 1, further comprising a retention screw, wherein the retention screw is operable to prevent inadvertent vertical movement of the external sleeve relative to the base.

20. A caster device comprising:
a base attachable to a supported item so as to be disposed between the supported item and a support surface;
at least one rolling element, each rolling element interfacing with the base so as to be disposed at least partially between the base and the support surface and so as to facilitate rolling of the supported item along the support surface;
an external sleeve coupled with the base and rotatable to adjust a vertical positioning of one of the base and the external sleeve relative to the other of the external sleeve and the base, wherein the external sleeve can be rotated to a first vertical position where said at least one rolling element does not contact the support surface, and wherein the external sleeve can be rotated to a second vertical position where said at least one rolling element contacts the support surface;
a retention screw, wherein the retention screw is operable to prevent inadvertent vertical movement of the external sleeve relative to the base; and
a rimguard rotatively coupled with the external sleeve and comprising a rimguard inner surface disposed facing a bottom rim of the external sleeve and a rimguard outer surface facing the support surface, wherein as the external sleeve is rotated to the first vertical position, the rimguard outer surface interacts with the support surface such that the rimguard outer surface does not rotate relative to the support surface while the bottom rim of the external sleeve rotates relative to the rimguard inner surface;
wherein the base includes (i) a threaded stud fixed to the base and having a thread for attaching the base to the supported item by rotating the threaded stud in a first direction and (ii) an externally-threaded portion; and
wherein the external sleeve includes an internally-threaded portion configured to interface with the externally-threaded portion of the base, and wherein the external sleeve can be rotated to the first position from the second position by rotating the external sleeve in the first direction.

* * * * *